United States Patent
Hirata et al.

(10) Patent No.: US 7,880,894 B2
(45) Date of Patent: Feb. 1, 2011

(54) VIBRATION DETECTION DEVICE AND VIBRATION DETECTOR

(75) Inventors: Shoji Hirata, Kanagawa (JP); Kazutoshi Nomoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 12/068,394

(22) Filed: Feb. 6, 2008

(65) Prior Publication Data

US 2008/0198386 A1 Aug. 21, 2008

(30) Foreign Application Priority Data

Feb. 16, 2007 (JP) ............................. 2007-036410

(51) Int. Cl.
*G01B 9/02* (2006.01)
(52) U.S. Cl. .................................... 356/486
(58) Field of Classification Search ................ 356/482, 356/484–487, 491–493, 497, 498, 502
See application file for complete search history.

(56) References Cited

U.S. PATENT DOCUMENTS 5,172,186 A * 12/1992 Hosoe ........................ 356/493
5,949,546 A * 9/1999 Lee et al. .................... 356/492
7,006,562 B2 * 2/2006 Chou ......................... 356/450

FOREIGN PATENT DOCUMENTS

| JP | 05040011 A | * | 2/1993 |
| JP | 05-227596 | | 9/1993 |
| JP | 05-227597 | | 9/1993 |
| JP | 06102009 A | * | 4/1994 |
| JP | 08-265262 | | 10/1996 |
| JP | 10-308998 | | 11/1998 |
| JP | 11-178099 | | 7/1999 |
| JP | 2005-203944 | | 7/2005 |

OTHER PUBLICATIONS

Kim et al, Laser Doppler vibrometer with body vibration compensation, Optical Engineering, vol. 42, No. 6, Aug. 2003, pp. 2291-2295.*

* cited by examiner

*Primary Examiner*—Samuel A Turner
(74) *Attorney, Agent, or Firm*—Rader, Fishman & Grauer PLLC

(57) ABSTRACT

A vibration detection device that includes a light source that emits a laser beam; an interferometer, which includes two vibrating bodies that are capable of reflecting the laser beam, that splits the laser beam to cause interference patterns; and a detector that detects vibrations on the basis of the interference patterns.

11 Claims, 12 Drawing Sheets

VIBRATION DETECTION DEVICE AND VIBRATION DETECTOR

CROSS REFERENCES TO RELATED APPLICATIONS

The present invention contains subject matter related to Japanese Patent Application JP 2007-036410 filed in the Japanese Patent Office on Feb. 16, 2007, the entire contents of which being incorporated herein by reference.

BACKGROUND OF THE INVENTION

1. Field of the Invention

The present invention relates to a vibration detection device optically detecting the displacement of a vibrating body.

2. Description of the Related Art

In recent years, recording systems and the like using a SACD (Super Audio Compact Disc) or 24-bit/96 kHz sampling have been used, and a trend toward higher sound quality is becoming mainstream. In such a trend, analog microphone apparatuses in related arts have a limit to record sound specifically with a high frequency of 20 kHz or over, so in the case where contents are recorded by making use of reproduction of high-frequency sound as a characteristic of the above-described recording systems, the analog microphone apparatuses are a bottleneck.

Moreover, the dynamic range of the analog microphone apparatuses does not reach 144 dB which is allowed in 24-bit recording as a characteristic of the above-described recording systems, so the analog microphone apparatuses do not sufficiently exploit a wide dynamic range.

Further, at a recording site, in analog microphone apparatuses in related arts, noises are increased due to a long analog cable run length, or it is necessary to supply phantom power from a mixing console to a condenser microphone, so it causes an impediment to total digitization in a recording/producing system.

Therefore, in recent years, some digital microphone apparatuses have been proposed (for example, refer to Japanese Unexamined Patent Application Publication Nos. H10-308998 and H11-178099).

SUMMARY OF THE INVENTION

In Japanese Unexamined Patent Application Publication No. H10-308998, a laser source and a Mach-Zehnder interferometer are used to detect vibrations of a vibrating plate, thereby digital audio signals are outputted.

On the other hand, in Japanese Unexamined Patent Application Publication No. H11-178099, a ΔΣ (delta sigma) converter including a laser source and a vibrating plate is configured. Therefore, it is considered that by the function of the ΔΣ converter, 1-bit digital audio signals can be obtained with a simple configuration, and noises of audio signals in an audible band can be reduced by a noise shaving effect.

In digital microphone apparatuses (more commonly, vibration detection devices) using a laser beam in related arts which include the digital microphone apparatuses disclosed in Japanese Unexamined Patent Application Publication Nos. H10-308998 and H11-178099 are monaural types. Therefore, in a digital microphone apparatus using a laser beam, a proposal of a stereo type digital microphone apparatus is desired.

In view of the foregoing, it is desirable to provide a vibration detection device capable of performing stereo detection when optically performing digital vibration detection.

According to an embodiment of the invention, there is provided a vibration detection device including: a light source; an interferometer and a detection means. In this case, the interferometer includes a first vibrating body and a second vibrating body both capable of reflecting the laser beam, and splits the laser beam into beams traveling along first to third optical paths, wherein the interferometer causes interference between a first reflected beam reflected by the first vibrating body in the first optical path and a reference beam passing through the third optical path to form a first interference pattern, and causes interference between a second reflected beam reflected by the second vibrating body in the second optical path and the reference beam to form a second interference pattern. The detection means quantizes the vibrations of the first and second vibrating bodies on the basis of the formed first and second interference patterns to detect the vibrations.

In the vibration detection device according to the embodiment, a laser beam emitted from the light source is split into beams traveling along three optical paths (first to third optical paths) by the interferometer. At this time, in the first optical path, a first reflected beam is reflected by a first vibrating body, and in the second optical path, a second reflected beam is reflected by a second vibrating body, and a reference beam travels along the third optical path. Moreover, the first reflected beam and the reference beam interfere with each other to form a first interference pattern, and the second reflected beam and the reference beam interfere with each other to form a second interference pattern. Then, on the basis of the first and second interference patterns, the vibrations of the first and second vibrating bodies are quantized to be detected. In other words, optical digital detection of the vibrations of two vibrating bodies is performed separately.

In the vibration detection device according to the embodiment of the invention, the above-described interferometer can be configured to include a beam splitter and a first polarizing beam splitter. In this case, the above-described beam splitter splits a laser beam emitted from the light source into laser beams, one of the laser beams going forward to the first and second optical paths and another going forward to the third optical path. Moreover, the above-described first polarizing beam splitter splits the one laser beam split by the beam splitter into laser beams traveling along the first optical path and the second optical path. In such a configuration, a laser beam emitted from the light source is split into a reference beam traveling along the third optical path and a laser beam traveling along the first and second optical paths by the beam splitter. Moreover, the laser beam traveling along the first and second optical paths is split into a laser beam traveling along the first optical path (a polarized component which becomes a first reflected beam) and a laser beam traveling along the second optical path (a polarized component which becomes a second reflected beam) by the first polarizing beam splitter.

Moreover, in this case, a reflection body capable of reflecting a laser beam traveling along the first optical path or the second optical path may be included each between the above-described first vibrating body and the first polarization beam splitter and between the second vibrating body and the first polarization beam splitter. In such a configuration, the traveling direction of a laser beam traveling along the first and second optical paths can be changed by the reflection body, so the positions or the directions (i.e., angles) of the first and second vibrating bodies can be freely changed. Therefore, the directivity or the spatial position capable of detecting vibrations of the vibration detection device can be finely adjusted.

In the vibration detection device according to the embodiment of the invention, the above-described interferometer can include a second polarizing beam splitter splitting the reference beam into a first polarized component and a second polarized component, and the above-described first interference pattern can be formed by interference between the first reflected beam and the first polarized component of the reference beam, and the above-described second interference pattern can be formed by interference between the second reflected beam and the second polarized component of the reference beam. In such a configuration, after the reference beam is split into the first polarized component and the second polarized component by the second polarizing beam splitter, the first interference pattern is formed by interference between the first polarized component of the reference beam and the first reflected beam, and the second interference pattern is formed by interference between the second polarized component of the reference beam and the second reflected beam.

Further, in the case where a polarization direction of the above-described first reflected beam is orthogonal to that of the first polarized component of the reference beam, and a polarization direction of the above-described second reflected beam is orthogonal to that of the second polarized component of the reference beam, the above-described interferometer preferably includes first polarizing plates and second polarizing plates between the second polarizing beam splitter and the detection means. In this case, the above-described first polarizing plates have a polarizing axis in a direction inclined 45° from each of the polarization direction of the first reflected beam and the polarization direction of the first polarized component of the reference beam. Moreover, the second polarizing plates have a polarizing axis in a direction inclined 45° from each of the polarization direction of the second reflected beam and the polarization direction of the second polarized component of the reference beam. In such a configuration, even in the case where the polarization direction of the first reflected beam and the polarization direction of the first polarized component of the reference beam are orthogonal to each other, or the polarization direction of the second reflected beam and the polarization direction of the second polarized component of the reference beam are orthogonal to each other, interference between beams in the polarization directions orthogonal to each other can be caused by the functions of the first and second polarizing plates, thereby the first and second interference patterns are formed.

In the vibration detection device according to the embodiment of the invention, the optical path length of the above-described third optical path is preferably designed to be substantially the same as the optical path length of each of the first and second optical paths. In such a configuration, an optical path difference between the third optical path (a reference optical path) and each of the first and second optical paths (reflection optical paths) is 0 (zero) or almost 0, so irrespective of the coherency (coherence) of a laser beam, favorable interference can be obtained; thereby the detection accuracy of vibrations of the vibrating bodies can be further improved.

In the vibration detection device according to the embodiment of the invention, the above-described detection means preferably includes four first photoelectric conversion devices, four second photoelectric conversion devices, a computation means, a figure producing means and a counter. In this case, the above-described four first photoelectric conversion devices detect the first interference patterns, and each of the first photoelectric conversion devices detects the first interference pattern with a phase different by 90° from a phase of the first interference pattern detected by the other first photoelectric conversion device, and the above-described four second photoelectric conversion devices detect the second interference patterns, and each of the second photoelectric conversion devices detects the second interference pattern with a phase different by 90° from a phase of the second interference pattern detected by the other second photoelectric conversion device. Moreover, the above-described computation means produces a pair of first differential signals by obtaining a difference between output signals, from the four first photoelectric conversion devices, with phases different by 180° from each other, and produces a pair of second differential signals by obtaining a difference between the output signals, from the four second photoelectric conversion devices, with phases different by 180° from each other. Further, the figure producing means produces a first lissajous figure with a circular or arc shape on a first plane based on each of the pair of first differential signals, and produces a second lissajous figure with a circular or arc shape on a second plane based on each of the pair of second differential signals. The above-described counter counts the number of times where a signal point defined by each of the first and second differential signals passes through a predetermined reference point on each of the produced first and second lissajous figures. In such a configuration, when the number of times where the signal point passes through on each of the first and second lissajous figures is counted by the counter, the displacement of vibrations of the first and second vibrating bodies are quantized to be detected. Moreover, a pair of differential signals are produced from a difference between output signals with phases different by 180° from each other from four photoelectric conversion devices with phases different by 90° from one another, and a lissajous figure is produced on the basis of the pair of differential signals, so even in the case where a DC (direct current) offset component is produced in the output signals from the photoelectric conversion devices, the DC offset component is removed, thereby the displacement of vibrations of the vibrating bodies can be stably detected.

In the vibration detection device according to the embodiment of the invention, a laser beam from the light source is split into beams traveling along three optical paths (the first to third optical paths) by the interferometer, and while in the first optical path (the first reflection optical path), the first reflected beam reflected by the first vibrating body and the reference beam traveling along the third optical path (the reference optical path) interfere with each other to form the first interference pattern, in the second optical path (the second reflection optical path), the second reflected beam reflected by the second vibrating body and the above-described reference beam interfere with each other to form the second interference pattern. On the basis of the first and second interference patterns, vibrations of the first and second vibrating bodies are quantized to be detected, so optical digital detection of the vibrations of two vibrating bodies can be performed separately. Therefore, when digital vibration detection is optically performed, stereo detection can be performed.

Other and further objects, features and advantages of the invention will appear more fully from the following description.

DETAILED DESCRIPTION OF THE PREFERRED EMBODIMENTS

Preferred embodiments will be described in detail below referring to the accompanying drawings.

First Embodiment

Figure 1:
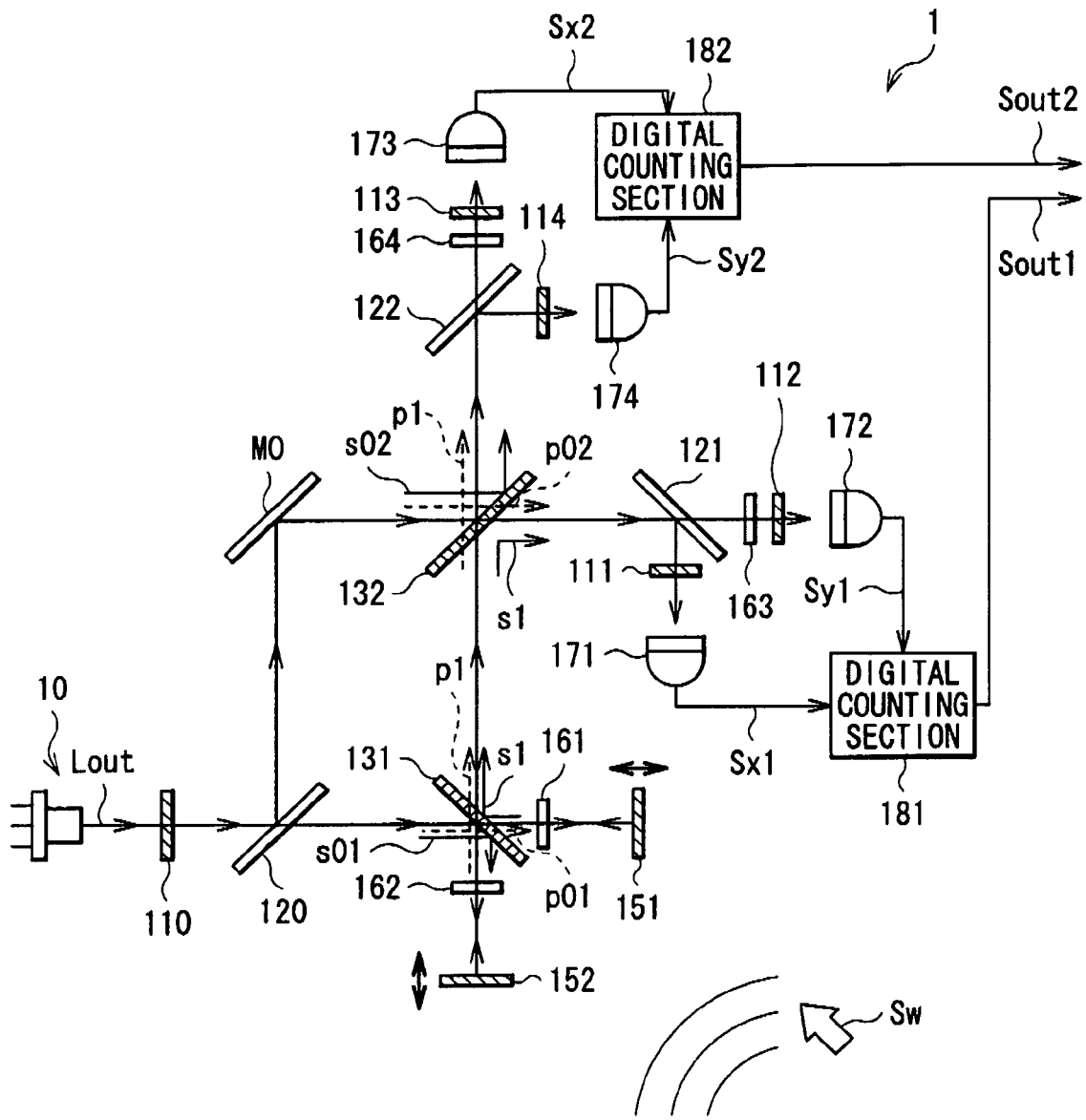
FIG. 1 is an illustration showing the whole configuration of a vibration detection device according to a first embodiment of the invention.

FIG. 1 shows the configuration of a vibration detection device (an optical microphone apparatus 1) according to a first embodiment of the invention. The microphone apparatus 1 outputs two binarized audio signals Sout1 and Sout2 through the use of vibration films (two vibration films 151 and 152 which will be described later) in response to a sonic wave Sw, and includes a laser source 10, a polarizing plate 110, an interferometer with a configuration based on a Michelson interferometer including two vibration films (the vibration films 151 and 152) which will be described later, and two detection sections (first and second detection sections) outputting two output signals (two audio signals Sout1 and Sout2) which are digital signals, respectively.

The laser source 10 emits a laser beam Lout, and includes, for example, a multimode (Fabry-Perot type) laser source (such as, for example, an edge-emitting type semiconductor laser source), a single mode laser source (such as, for example, a surface-emitting type semiconductor laser source or a DFB (Distributed FeedBack) laser) or the like.

The polarizing plate 110 changes the direction of linear polarization of the laser beam Lout emitted from the laser source 10. More specifically, the polarizing axis of the polarizing plate 110 is oriented so that the direction of linear polarization of the laser beam Lout passing through the polarizing plate 110 is changed to be different by 45° from each of two polarizing axes of the polarizing beam splitter 131 which will be described later. In the case where the direction of linear polarization of the emitted laser beam Lout can be oriented in such a direction by rotating the laser source 10, the polarizing plate 110 is not necessarily arranged. However, in the case where the polarizing plate 110 is arranged as in the case of the embodiment of FIG. 1, irrespective of the accuracy of the rotation position of the laser source 10, the direction of linear polarization of an incident beam to the polarizing beam splitter 131 can be oriented as described above.

<Configuration of Interferometer>

The interferometer includes a beam splitter 120, two polarizing beam splitters 131 and 132, two vibration films 151 and 152, four λ/4 plates 161 to 164, a reflective mirror M0, three beam splitters 120 to 122, and four polarizing plates 111 to 114.

The beam splitter 120 splits the laser beam Lout which is emitted from the laser source 10 and passes through the polarizing plate 110 into approximately 50% of the laser beam L out traveling along a reference optical path (a third optical path) as an optical path of a reference beam which will be described later and approximately 50% of the laser beam Lout traveling along reflection optical paths (first and second optical paths) which are optical paths of a reflected beam which will be described later. More specifically, the beam splitter 120 splits the laser beam Lout passing through the polarizing plate 110 into a portion of the laser beam Lout traveling along an optical path (the reference optical path) to the reflective mirror M0 and a portion of the laser beam Lout traveling along an optical path (a reflection optical path) to the polarizing beam splitter 131. The reflective mirror M0 is a mirror capable of reflecting the laser beam Lout which is a reference beam with a reflectivity of almost 100%. In the reference optical path shown in FIG. 1, the reference beam is reflected at a substantially right angle by each of the beam splitter 120 and the reflective mirror M0.

The polarizing beam splitter 131 splits the laser beam Lout which is split by the beam splitter 120 and travels along the reflection optical path into two components of the laser beam Lout traveling along two optical paths, that is, a first reflection optical path (the first optical path) to the vibration film 151 and a second reflection optical path (the second optical path) to the vibration film 152. More specifically, although the details will be described later, the polarizing beam splitter 131 is designed to make a P-polarized component p01 and an S-polarized component s01 of the laser beam Lout travel along the first reflection optical path and the second reflection optical path, respectively. As described above, the direction of linear polarization of the laser beam Lout entering the polarizing beam splitter 131 is oriented in a direction different by 45° from each of two polarizing axes (an S-polarizing axis and a P-polarizing axis) of the polarizing beam splitter 131, so the laser beam Lout entering the polarizing beam splitter 131 is split into the P-polarized component p01 and the S-polarized component s01 by approximately 50% each.

The vibration films 151 and 152 are displaced in response to the sonic wave Sw, and each of them is made of, for example, the same vibration film with a gold evaporated surface or the like as that used in a condenser microphone. The vibration films 151 and 152 can reflect the laser beam Lout with a reflectivity of almost 100%. Moreover, a λ/4 plate 161 is arranged on an optical path between the polarizing beam splitter 131 and the vibration film 151, and a λ/4 plate 162 is arranged on an optical path between the polarizing beam splitter 131 and the vibration film 152.

The polarizing beam splitter 132 allows two reflected beams (an S-polarized component s1 (a first reflected beam)

and a P-polarized component p1 (a second reflected beam)) which are reflected by the vibration films 151 and 152 to enter the polarizing beam splitter 132 via the polarizing beam splitter 131 to travel along two optical paths, that is, a first reflection optical path (the first optical path) to the beam splitter 121 and a second reflection optical path (the second optical path) to the beam splitter 122, respectively. More specifically, although the details will be described later, the polarizing beam splitter 132 is designed to make the S-polarized component s1 (the first reflected beam) and the P-polarized component p1 as reflected beams travel along the first reflection optical path and the second reflection optical path, respectively. The polarizing beam splitter 132 also splits the reference beam which is reflected by the reflective mirror M0 to enter the polarizing beam splitter 132 into two polarized components, that is, a P-polarized component p02 (a first polarized component) traveling along the first reflection optical path and an S-polarized component (a second polarized component) traveling along the second reflection optical path. The direction of linear polarization of the reference beam entering the polarizing beam splitter 132 is oriented in a direction different by 45° from each of two polarizing axes (an S-polarizing axis and a P-polarizing axis) of the polarizing beam splitter 132 as in the case of the laser beam Lout entering the polarizing beam splitter 131, so the reference beam entering the polarizing beam splitter 132 is split into the P-polarized component p02 and the S-polarized component s02 by approximately 50% each.

The beam splitter 121 splits the S-polarized component s1 (the first reflected beam) and the P-polarized component p02 (the first polarized component) of the reference beam both of which enter the beam splitter 121 via the polarizing beam splitter 132, respectively, into approximately 50% of each of the S-polarized component s1 and the P-polarized component p02 going forward to an optical path to the polarizing plate 111 and approximately 50% of each of the S-polarized component s1 and the P-polarized component p02 going forward to a optical path to the polarizing plate 112.

The polarizing plates 111 and 112 each are a polarizing plate having a polarizing axis in a direction different by 45° from each of the polarization direction of the entering S-polarized component s1 (the first reflected beam) and the polarization direction of the P-polarized component p02 (the first polarized component) of the reference beam. Although the details will be described later, by such a configuration, in the polarizing plates 111 and 112, the S-polarized component s1 and the P-polarized component p02 of the reference beam interfere with each other to form interference patterns (first interference patterns). A λ/4 plate 163 is arranged on an optical path between the beam splitter 121 and the polarizing plate 112.

The beam splitter 122 splits the P-polarized component p1 (the second reflected beam) and the S-polarized component s02 (the second polarized component) of the reference beam both of which enter the beam splitter 122 via the polarizing beam splitter 132, respectively, into approximately 50% of each of the P-polarized component p1 and the S-polarized component s02 going forward to an optical path to the polarizing plate 113 and approximately 50% of each of the P-polarized component p1 and the S-polarized component s02 going forward to an optical path to the polarizing plate 114.

The polarizing plates 113 and 114 each are a polarizing plate having a polarizing axis in a direction different by 45° from each of the polarization direction of the entering P-polarized component p1 (the second reflected beam) and the polarization direction of the S-polarized component s02 (the second polarized component) of the reference beam. Although the details will be described later, by such a configuration, in the polarizing plates 113 and 114, the P-polarized component p1 and the S-polarized component s02 of the reference beam interfere with each other to form interference patterns (second interference patterns). A λ/4 plate 164 is arranged on an optical path between the beam splitter 122 and the polarizing plate 113.

By such a configuration, in the interferometer according to the embodiment, the laser beam Lout emitted from the laser source 10 is split into three beams traveling along three optical paths (the first, second and third optical path). More specifically, the laser beam Lout is split into a beam traveling along the first optical path (the first reflection optical path) passing through the beam splitter 120, the polarizing beam splitter 131, the λ/4 plate 161, the vibration film 151, the λ/4 plate 161, the polarizing beam splitter 131, the polarizing beam splitter 132, the beam splitter 121, the polarizing plates 111 and 112 and the λ/4 plate 163, a beam traveling along the second optical path (the second reflection optical path) passing through the beam splitter 120, the polarizing beam splitter 131, the λ/4 plate 162, the vibration film 152, the λ/4 plate 162, the polarizing beam splitter 131, the polarizing beam splitter 132, the beam splitter 122, the polarizing plates 113 and 114 and the λ/4 plate 164, and a beam traveling along the third optical path (a reference optical path) passing through the beam splitter 120, the reflective mirror M0, the polarizing beam splitter 132, the beam splitters 121 and 122, the polarizing plates 111 to 114 and the λ/4 plates 163 and 164, and the beams travel along the optical paths. At this time, in the first reflection optical path, the beam (the S-polarized components s1, the first reflected beam) reflected by the vibration film 151 (a first vibrating body) and the reference beam passing through the reference optical path (more specifically, the P-polarized component p02 of the reference beam) interfere with each other in the polarizing plates 111 and 112 to form the first interference patterns. On the other hand, in the second reflection optical path, the beam (the P-polarized component p1, the second reflected beam) reflected by the vibration film 152 (a second vibrating body) and the reference beam passing through the reference optical path (more specifically, the S-polarized component s02 of the reference beam) interfere with each other in the polarizing plates 113 and 114 to form the second interference patterns.

<Configuration of First Detection Section>

The first detection section includes two photoelectric conversion devices 171 and 172 and a digital counting section 181.

The photoelectric conversion devices 171 and 172 detect the first interference patterns formed on the polarizing plates 111 and 112, respectively, to perform photoelectric conversion on the first interference patterns, and then the photoelectric conversion devices 171 and 172 output signals Sx1 and Sy1, respectively. The photoelectric conversion devices 171 and 172 each include, for example, a PD (a Photo Diode) or the like.

The digital counting section 181 counts the output signals Sx1 and Sy1 outputted from the photoelectric conversion devices 171 and 172, respectively, at predetermined counting intervals which will be described later through the use of, for example, a lissajous figure shown in FIG. 2 to quantize the output signals Sx1 and Sy1; thereby the digital counting section 181 outputs an output signal (an audio signal Sout1) which is a digital signal. A digital counting method using such a lissajous figure will be described in detail later.

<Configuration of Second Detection Section>

The second detection section includes two photoelectric conversion devices 173 and 174 and a digital counting section 182.

The photoelectric conversion devices 173 and 174 detect the second interference patterns formed on the polarizing plates 113 and 114, respectively, to perform photoelectric conversion on the second interference patterns, and then the photoelectric conversion devices 173 and 174 output signals Sx2 and Sy2, respectively. The photoelectric conversion devices 173 and 174 each include, for example, a PD (a Photo Diode) or the like.

The digital counting section 182 counts the output signals Sx2 and Sy2 outputted from the photoelectric conversion devices 173 and 174, respectively, at predetermined counting intervals which will be described later through the use of the above-described lissajous figure to quantize the output signals Sx2 and Sy2, thereby the digital counting section 182 outputs an output signal (an audio signal Sout2) which is a digital signal.

Figure 3:
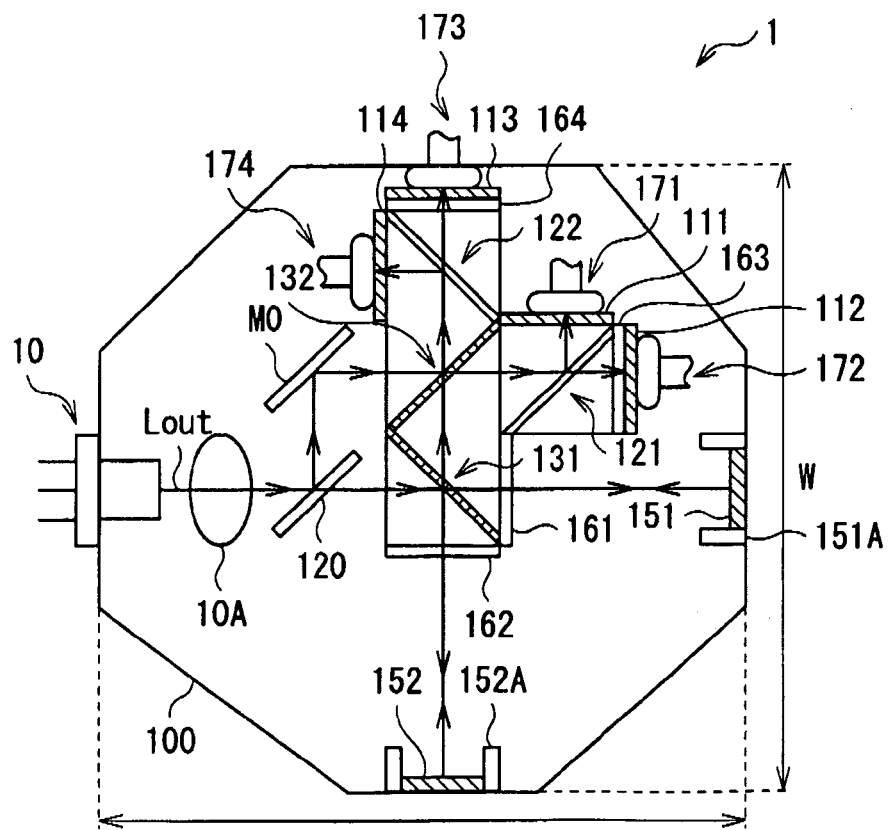
FIG. 3 is a plan view showing a configuration example in the case where the vibration detection device shown in FIG. 1 is arranged on a single substrate.

Next, referring to FIG. 3, a configuration example in the case where the microphone apparatus 1 according to the embodiment is formed on a single substrate will be described below. FIG. 3 shows a plan view in the case where the microphone apparatus 1 shown in FIG. 1 is formed on a single substrate 100.

In the microphone apparatus 1 shown in FIG. 3, the laser source 10, a collimator lens 10A for condensing the laser beam Lout, the beam splitter 120, the reflective mirror M0, the vibration films 151 and 152, support sections 151A and 152A supporting the vibration films 151 and 152 from both sides, the polarizing plates 111 to 114, the beam splitters 121 and 122, the polarizing beam splitters 131 and 132, the λ/4 plates 161 to 164 and the photoelectric conversion devices 171 to 174 are arranged on the a substrate (the substrate 100) made of aluminum die-casting or the like. Among them, the polarizing plates 111 to 114, the beam splitters 121 and 122, the polarizing beam splitters 131 and 132, the λ/4 plates 161 to 164 and the photoelectric conversion devices 171 to 174 are combined together, and are arranged as one unit. In the microphone apparatus 1 shown in FIG. 3, the polarizing plate 110 is not arranged; however, the polarizing plate 110 may be arranged. Moreover, a stereo effect which will be described later is further enhanced in the case where two vibration films 151 and 152 are arranged at an appropriate distance from each other, so it is preferable that they are not arranged too close. When the microphone apparatus 1 is configured using a discrete optical member in such a manner, the microphone apparatus 1 shown in FIG. 3 has a small (compact) and firm configuration. The widths L and W (refer to FIG. 3) of the apparatus in this case can fall in, for example, L=W=approximately 20 mm or less.

In this case, the photoelectric conversion devices 171 and 172 correspond to a specific example of "two first photoelectric conversion devices" in the invention, and the photoelectric conversion devices 173 and 174 correspond to a specific example of "two second photoelectric conversion devices" in the invention. Moreover, the photoelectric conversion devices 171 to 174 and the digital counting sections 181 and 182 correspond to specific examples of "a detection means" in the invention, and the digital counting sections 181 and 182 correspond to specific examples of "a figure producing means" and "a counter" in the invention. Further, the beam splitter 120 corresponds to a specific example of "a beam splitter" in the invention, and the polarizing beam splitter 131 corresponds to a specific example of "a first polarizing beam splitter" in the invention, and the polarizing beam splitter 132 corresponds to a specific example of "a second polarizing beam splitter" in the invention. The polarizing plates 111 and 112 correspond to a specific example of "first polarizing plates" in the invention, and the polarizing plates 113 and 114 correspond to a specific example of "second polarizing plates" in the invention. Moreover, an x1-y1 plane shown in FIG. 2 corresponds to a specific example of "a first plane" in the invention, and a lissajous figure on the x1-y1 plane corresponds to a specific example of "a first lissajous figure" in the invention, and an x2-y2 plane shown in FIG. 2 corresponds to a specific example of "a second plane" in the invention, and a lissajous figure on the x2-y2 plane corresponds to a specific example of "a second lissajous figure" in the invention.

Next, referring to FIGS. 1 and 2, the operation of the microphone apparatus 1 according to the embodiment will be described in detail below.

In the microphone apparatus 1, as shown in FIG. 1, when the laser beam Lout is emitted from the laser source 10, and passes through the polarizing plate 110, the direction of linear polarization of the laser beam Lout is changed to a direction different by 45° from each of two polarizing axes (the S-polarizing axis and the P-polarizing axis) of the polarizing beam splitter 131.

Next, the laser beam Lout passing through the polarizing plate 110 is split into approximately 50% of the laser beam Lout going forward to the optical path (the reference optical path) to the reflective mirror M0 and approximately 50% of the laser beam Lout going forward to the optical path (the reflection optical path) to the polarizing beam splitter 131 by the beam splitter 120, and they travel along the optical paths. Thereby, the laser beam Lout is split into the reference beam traveling along the reference optical path (the third optical path) and a beam (a beam which becomes a reflected beam) traveling along the reflection optical paths (the first and second optical paths). After that, the reference beam is reflected by the reflective mirror M0 on the reference optical path to reach the polarizing beam splitter 132.

On the other hand, the beam traveling along the reflection optical path is split into approximately 50% of the beam going forward to the first reflection optical path (the first optical path) to the vibration film 151 and approximately 50% of the beam going forward to the second reflection optical path (the second optical path) to the vibration film 152 by the polarizing beam splitter 131, and they travel along the optical paths. Thereby, the laser beam Lout traveling along the reflection optical paths is split into the P-polarized component p01 traveling along the first reflection optical path and the S-polarized component s01 traveling along the second reflection optical path. In other words, in the polarizing beam splitter 131, a beam of the S-polarized component is reflected, and a beam of the P-polarized component passes through the polarizing beam splitter 131.

In this case, when the P-polarized component p01 passes through the λ/4 plate 161, the P-polarized component p01 is changed from linear polarization to circular polarization, and after that, when the P-polarized component p01 is reflected by the vibration film 151, the P-polarized component p01 is changed to reverse circular polarization, and passes through the λ/4 plate 161 again, thereby the P-polarized component p01 is converted into the S-polarized component s1 (the first reflected beam). Then, the S-polarized component s1 is reflected by the polarizing beam splitter 131 as described above, so the S-polarized component s1 travels along the reflection optical path (the first reflection optical path) toward the polarizing beam splitter 132. On the other hand, when the S-polarized component s01 passes through the λ/4 plate 162, the S-polarized component S01 is changed from linear polarization to circular polarization, and after that, when the S-polarized component s01 is reflected by the vibration film 152, the S-polarized component s01 is changed to reverse circular polarization, and passes through the λ/4 plate 162 again, thereby the S-polarized component s01 is converted into the P-polarized component p1 (the second reflected beam). Then, the P-polarized component p1 passes through the polarizing beam splitter 131 as described above, so the P-polarized component p1 travels along the reflection optical path (the second reflection optical path) toward the polarizing beam splitter 132. At this time, the S-polarized component s1 and the P-polarized component p1 which travel along the same reflection optical paths (the first and second reflection optical paths) have polarization directions different by 90° from each other, so they do not interfere with each other.

Next, when the S-polarized component s1 and the P-polarized component p1 reach the polarizing beam splitter 132, they separately travel along two optical paths. More specifically, while the S-polarized component s1 (the first reflected beam) is reflected by the polarizing beam splitter 132 to travel along the optical path (the first reflection optical path) to the beam splitter 121, the P-polarized component p1 (the second reflected beam) passes through the polarizing beam splitter 132 to travel along the optical path (the second reflection optical path) to the beam splitter 122. In other words, in the polarizing beam splitter 132, a beam of the S-polarized component is reflected, and a beam of the P-polarized component passes through.

Moreover, in the polarizing beam splitter 132, the reference beam reflected by the reflective mirror M0 to reach the polarizing beam splitter 132 is split into two polarized components, that is, the P-polarized component p02 (the first polarized component) traveling along the first reflection optical path and S-polarized component s02 (the second polarized component) traveling along the second reflection optical path by approximately 50% each.

At this time, the S-polarized component s1 and the P-polarized component p02 traveling along the same reflection optical path (the first reflection optical path) have polarization directions different by 90° from each other, so they do not interfere with each other. Moreover, the P-polarized component p1 and the S-polarized component s02 traveling along the same reflection optical path (the second reflection optical path) have polarization directions different by 90° from each other, so they do not interfere with each other.

Next, the S-polarized component s1 (the first reflected beam) traveling along the first reflection optical path and the P-polarized component p02 (the first polarized component) of the reference beam are split into approximately 50% of each of the S-polarized component s1 and the P-polarized component p02 going forward to the optical path to the polarizing plate 111 and approximately 50% of each of the S-polarized component s1 and the P-polarized component p02 going forward to the optical path to the polarizing plate 112, and they travel along the optical paths to reach the polarizing plates 111 and 112. At this time, a λ/4 plate is inserted in the middle of the optical path to the polarizing plate 112, so the S-polarized component s1 and the P-polarized component p02 which reach the polarizing plate 111 and the S-polarized component s1 and the P-polarized component p02 which reach the polarizing plate 112 have phases different by 90° from each other. The polarizing plates 111 and 112 each have a polarizing axis in a direction inclined 45° from each of the polarization direction of the S-polarized component s1 and the polarization direction of the P-polarized component p02, so in the embodiment in which the phases of the S-polarized component s1 and the P-polarized component p02 are different by 90° from each other, the S-polarized component s1 and the P-polarized component p02 of the reference beam interfere with each other in the polarizing plates 111 and 112 to form the interference patterns (the first interference patterns).

Moreover, likewise, the P-polarized component p1 (the second reflected beam) traveling along the second reflection optical path and the S-polarized component s02 (the second polarized component) of the reference beam are split into approximately 50% of each of the P-polarized component p1 and the S-polarized component s02 going forward to the optical path to the polarizing plate 113 and approximately 50% of each of the P-polarized component p1 and the S-polarized component s02 going forward to the optical path to the polarizing plate 114 by the beam splitter 122, and they travel along the optical paths to reach the polarizing plates 113 and 114. At this time, a λ/4 plate is inserted in the middle of the optical path to the polarizing plate 113, so the P-polarized component p1 and the S-polarized component s02 which reach the polarizing plate 113 and the P-polarized component p1 and the S-polarized component s02 which reach the polarizing plate 114 have phases different by 90° from each other. Therefore, the polarizing plates 113 and 114 each have a polarizing axis in a direction inclined 45° from each of the polarization direction of the P-polarized component p1 and the polarization direction of the S-polarized component s02, so in the embodiment in which the phases of the P-polarized component p1 and the S-polarized component s02 are different by 90° from each other, in the polarizing plates 113 and 114, the P-polarized component p1 and the S-polarized component s02 of the reference beam interfere with each other to form interference patterns (second interference patterns).

Next, while the interference patterns formed on the polarizing plates 111 and 112 are detected by the photoelectric conversion devices 171 and 172, respectively, the interference patterns formed on the polarizing plates 113 and 114 are detected by the photoelectric conversion devices 173 and 174, respectively. In this case, as described above, the S-polarized component s1 and the P-polarized component p02 which reach the polarizing plate 111 and the S-polarized component s1 and the P-polarized component p02 which reach the polarizing plate 112 have phases different by 90° from each other, and the P-polarized component p1 and the S-polarized component s02 which reach the polarizing plate 113 and the P-polarized component p1 and the S-polarized component s02 which reach the polarizing plate 114 have phases different by 90° from each other, so in the photoelectric conversion devices 171 and 172, the first interference patterns are detected in a state in which the phases thereof are different by 90° from each other, and in the photoelectric conversion devices 173 and 174, the second interference patterns are detected in a state in which the phases thereof are different by 90° from each other. Then, the interference patterns detected by the photoelectric conversion devices 171 and 173 are converted into electrical signals, and the electrical signals are outputted as output signals Sx1 and Sx2, and on the other hand, the interference patterns detected by the photoelectric conversion devices 172 and 174 are converted into electrical signals, and the electrical signals are outputted as output signals Sy1 and Sy2.

Figure 2:
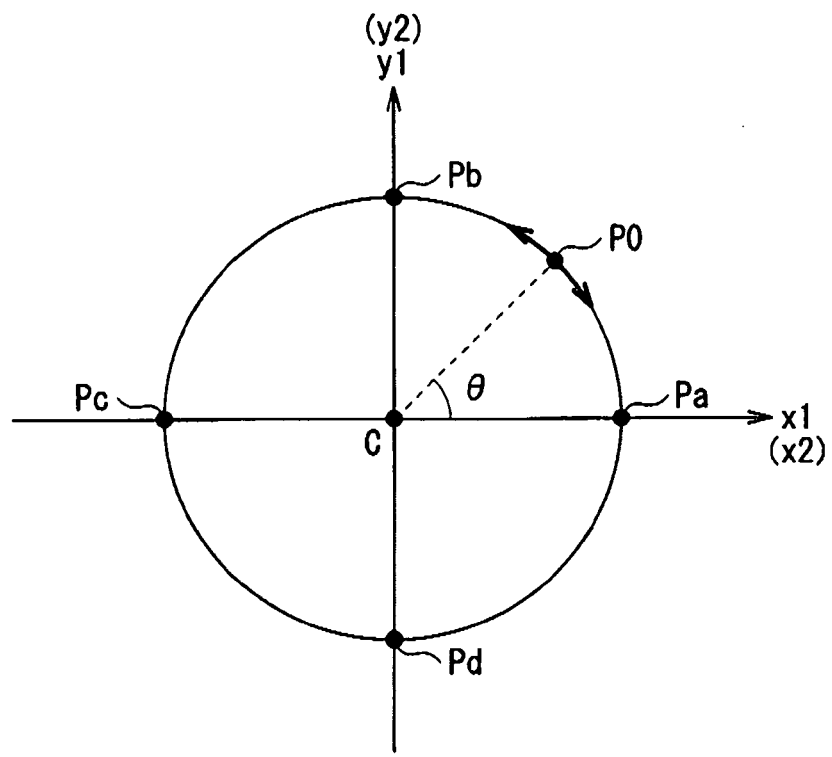
FIG. 2 is an illustration showing an example of a lissajous figure produced in a digital counting section shown in FIG. 1.

Next, in the digital counting section 181, the output signals Sx1 and Sy1 from the photoelectric conversion devices 171 and 172 are considered as an X1 signal and a Y1 signal, respectively, and, for example, a lissajous figure (the first lissajous figure) with a circular or arc shape shown in FIG. 2 is produced. More specifically, at first, the median value of the strength of the interference pattern by a (X1, Y1) signal is defined as a central point C1 (CX1, XY1), and the computation of the following formulas (1) and (2) is performed to convert the (X1, Y1) signal to a (x1, y1) signal.

$$x1 = X - CX1 \quad (1)$$

$$y1 = Y - CY1 \quad (2)$$

Then, according to the computation of the above-described formulas (1) and (2), the signal point (x1, y1), as shown in FIG. 2, travels along a lissajous figure, i.e., on the circumference of a circle around the central point C1. At this time, a detection point (for example, a signal point P0 in the drawing) detected by the photoelectric conversion devices 171 and 172 is one point on the circumference of the circle, and the detection point is displaced on the circumference of the circle according to the displacement of the vibration film 151. Therefore, when the number of times where such a signal point P0 passes through a predetermined reference point (for example, four reference points Pa to Pd on an x1 axis and a y1 axis) is counted, the strength of the interference pattern is uniquely determined, so the displacement of the vibration film 151 is digitally detected, and the counted number is outputted as an audio signal Sout1 which is a digital signal as information of an angle α. In the case where the number of times where the signal point P0 passes through four reference points Pa to Pd as reference points is counted in such a manner, it means that the number of times where the interference patterns are shifted by 90° (¼ wavelength) is counted.

Likewise, in the digital counting section 182, output signals Sx2 and Sy2 from the photoelectric conversion devices 173 and 174 are considered as an X2 signal and a Y2 signal, respectively, and, for example, a lissajous figure (the second lissajous figure) with a circular or arc shape shown in FIG. 2 is produced. More specifically, at first, the median value of the strength of the interference pattern by a (X2, Y2) signal is defined as a central point C2 (CX2, CY2), and the computation of the following formulas (3) and (4) is performed to convert the (X2, Y2) signal into a (x2, y2) signal.

$$x2 = X2 - CX2 \quad (3)$$

$$y2 = Y2 - CY2 \quad (4)$$

Then, according to the computation of the above-described formulas (3) and (4), the signal point (x2, y2), as shown in FIG. 2, travels along a lissajous figure, i.e., on the circumference of a circle around the central point C2. At this time, a detected point (for example, the signal point P0 in the drawing) detected by the photoelectric conversion devices 173 and 174 is one point on the circumference of the circle, and the detection point is displaced on the circumference of the circle according to the displacement of the vibration film 152. Therefore, when the number of times where such a signal point P0 passes through a predetermined reference point (for example, four reference points Pa to Pd on an x2 axis and a y2 axis) is counted, the strength of the interference pattern is uniquely determined, so the displacement of the vibration film 152 is digitally detected, and the counted number is outputted as an audio signal Sout2 which is a digital signal as information of an angle α.

As described above, in the embodiment, the laser beam Lout from the laser source 10 is split into beams traveling along three optical paths (the first to third optical paths) in the interferometer, and while the S-polarized component s1 (the first reflected beam) reflected by the vibration film 151 in the first optical path (the first reflection optical path) and the reference beam (more specifically, the P-polarized component p02 of the reference beam) passing through the third optical path (the reference optical path) interfere with each other to form the first interference patterns, the P-polarized component p1 (the second reflected beam) reflected by the vibration film 152 in the second optical path (the second reflection optical path) and the reference beam (more specifically the S-polarized component s02 of the reference beam) interfere with each other to form the second interference patterns, and on the basis of the first and second interference patterns, the vibrations of the vibration films 151 and 152 are quantized to be detected, so optical digital detection of vibrations of two vibration films 151 and 152 can be performed separately. Therefore, when digital vibration detection is optically performed, stereo detection can be performed.

Moreover, the interferometer with a configuration based on the Michelson interferometer is used as the interferometer, so the microphone apparatus with a small and simple configuration can be achieved.

Moreover, the interferometer is configured using the polarizing beam splitter 131 and the λ/4 plates 161 and 162, so the reverse of the laser beam Lout to the laser source 10 which occurs in a pure Michelson interferometer can be prevented, and noise generation in the laser source 10 can be prevented. Therefore, compared to the case where the interferometer is configured using a pure Michelson interferometer, a better S/N ratio can be obtained, the detection accuracy of vibrations of the vibration films 151 and 152 can be improved.

Moreover, the first and second interference patterns are detected with two photoelectric conversion devices 171 and 172 and two photoelectric conversion devices 173 and 174, respectively, and a phase difference between the interference patterns detected by two photoelectric conversion devices is designed to be approximately 90°, so a circular lissajous figure can be formed as below, and detection can be easily performed.

Moreover, the output signals Sx1 and Sy1 from two photoelectric conversion devices 171 and 172 or the output signal Sx2 and Xy2 from two photoelectric conversion devices 173 and 174 are converted into the X1 signal and the Y1 signal or the X2 signal and the Y2 signal, respectively, and a lissajous figure with a circular or arc shape on the basis of the X1 and Y1 signals or the X2 and Y2 signals is produced, so the detected point of the first or second interference pattern is displaced on the circumference of a circuit according to displacement of the vibration film 151 or 152, and the number of times where the detected point passes through a predetermined reference point is counted, thereby digital detection of the displacement of the vibration films 151 and 152 can be performed separately.

Figure 4:
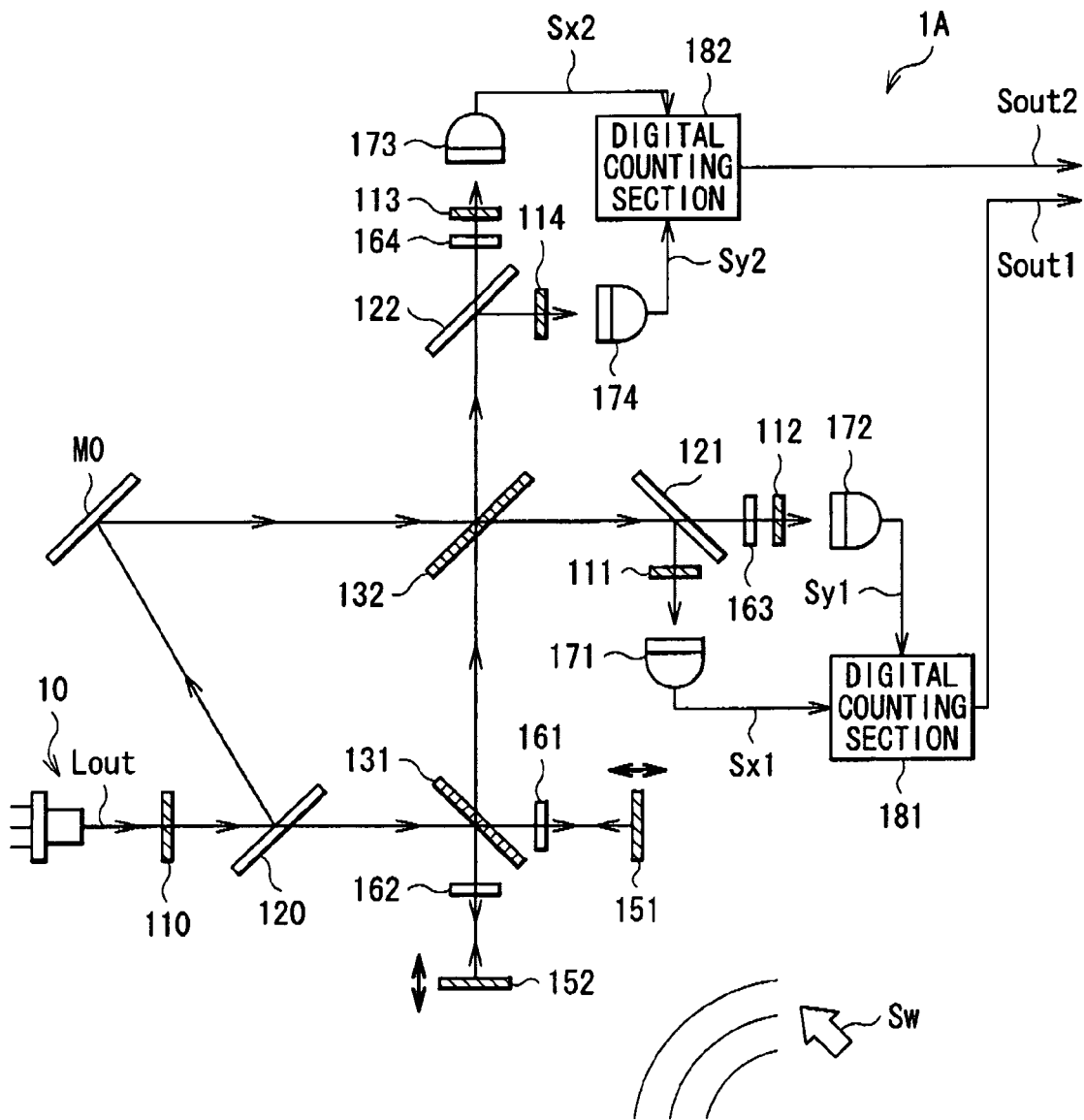
FIG. 4 is an illustration showing the whole configuration of a vibration detection device according to a modification of the first embodiment.
Figure 5:
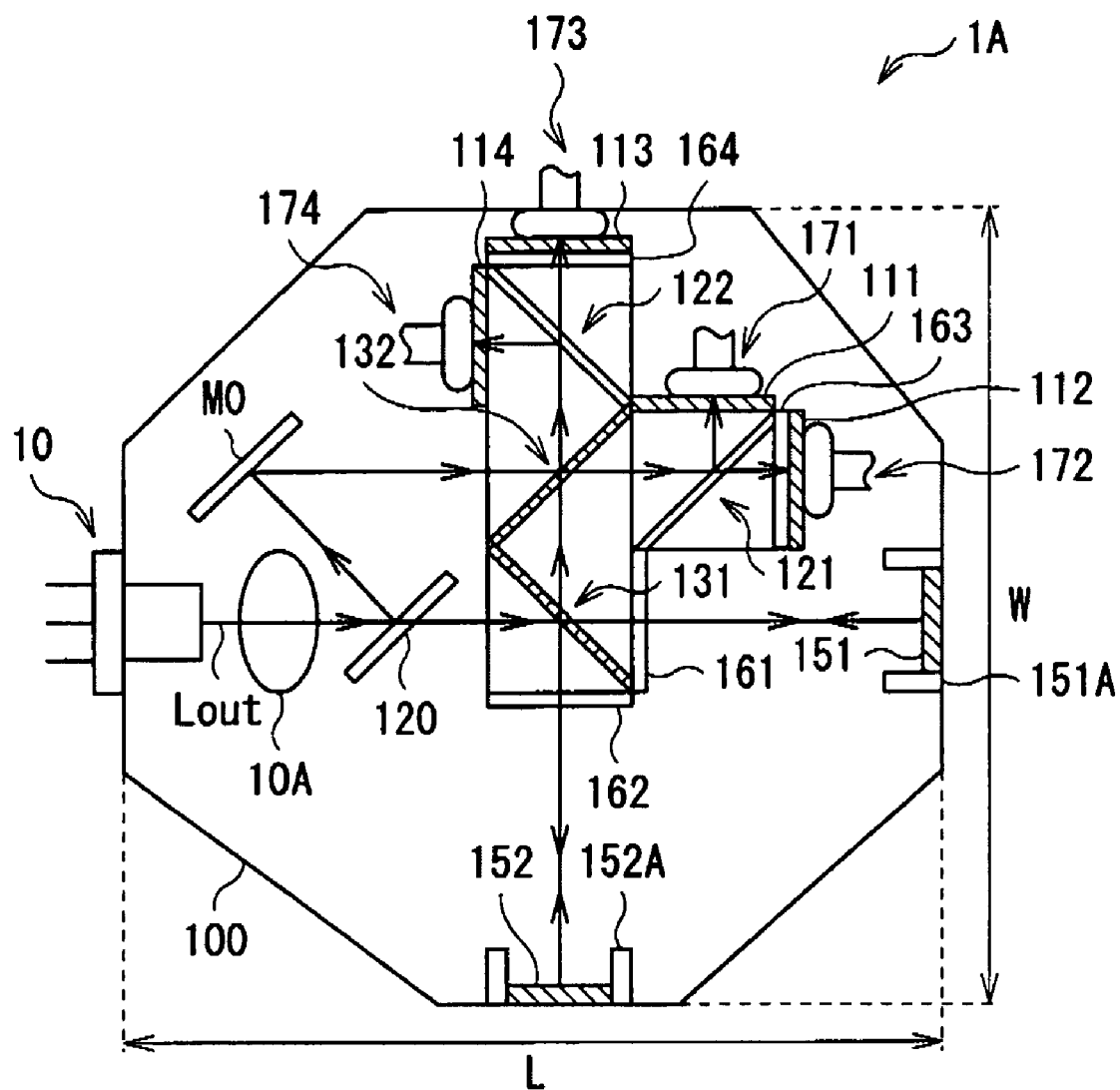
FIG. 5 is a plan view showing a configuration example in the case where the vibration detection device shown in FIG. 4 is arranged on a single substrate.

In the embodiment, as shown in FIG. 1, the case where the optical path length of each of the first and second optical paths (the reflection optical paths) and the optical path length of the third optical path (the reference optical path) are different from each other (in this case, the reflection optical paths are designed to be longer) is described; however, for example, like a microphone apparatus 1A shown in FIGS. 4 and 5, the positions, angles or the like of the beam splitter 120 and the reflective mirror M0 are preferably adjusted so that the optical path length of the third optical path becomes substantially the same as the optical path length of each of the first and second optical paths. In such a configuration, an optical path difference between the third optical path and the first and second optical paths is 0 (zero) or almost 0, so irrespective of the coherency (coherence) of a laser beam, favorable interference can be obtained. Therefore, compared to the embodiment, the detection accuracy of vibrations of the vibration films 151 and 152 can be further improved.

Figure 6:
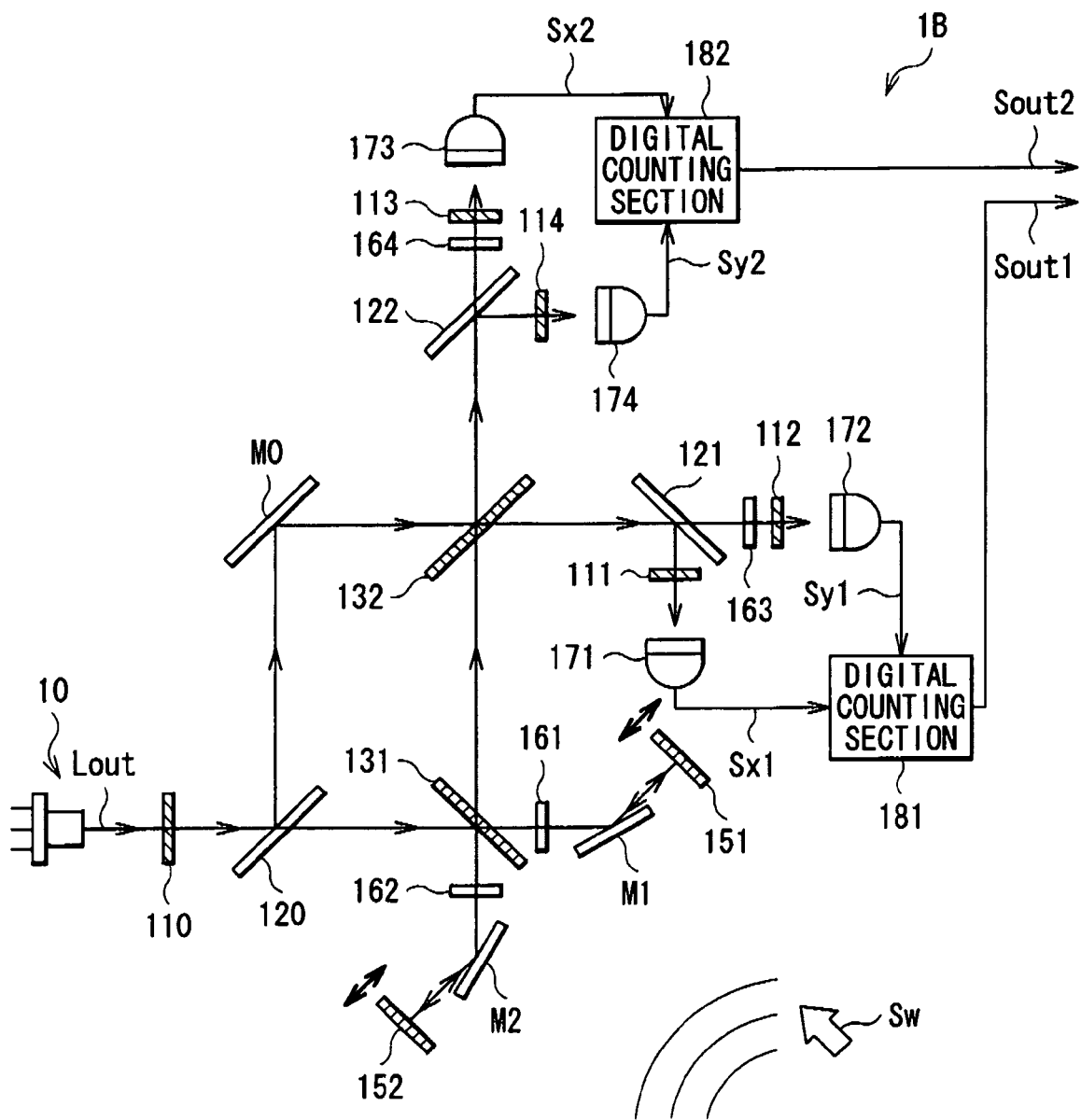
FIG. 6 is an illustration showing the whole configuration of a vibration detection device according to another modification of the first embodiment.
Figure 7:
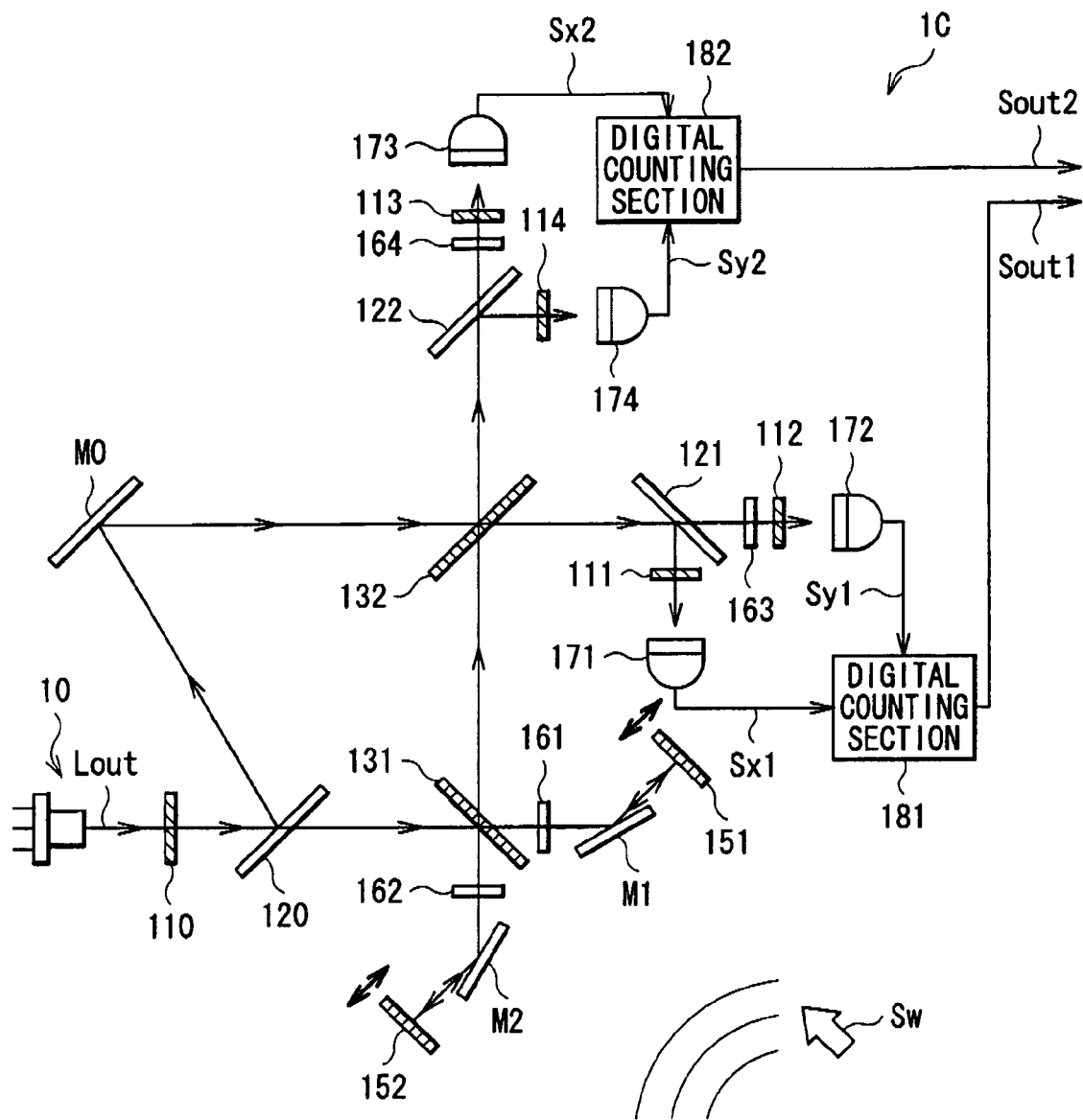
FIG. 7 is an illustration showing the whole configuration of a vibration detection device according to still another modification of the first embodiment.

Moreover, for examples, like microphone apparatuses 1B and 1C shown in FIGS. 6 and 7, reflective mirrors M1 and M2 (reflection bodies) which can reflect a laser beam traveling along the first optical path or the second optical path may be arranged between the vibration film 151 and the λ/4 plate 161 (or the polarization beam splitter 131) and between the vibration film 152 and the λ/4 plate 162 (or the polarization beam splitter 131). In such a configuration, the traveling directions of the laser beams traveling along the first and second optical paths can be changed by the reflective mirrors M1 and M2, and the positions or directions (angles) of the vibration films 151 and 152 can be freely set. Therefore, the directivity and the spatial positions capable of detecting vibrations of the microphone apparatuses can be finely adjusted. Also in this case, as in the case shown in FIG. 3 or 5, the microphone apparatuses 1B and 1C can be formed on the substrate 100.

Second Embodiment

Next, a second embodiment of the invention will be described below. Like components are denoted by like numerals as of the first embodiment and will not be further explained.

Figure 8:
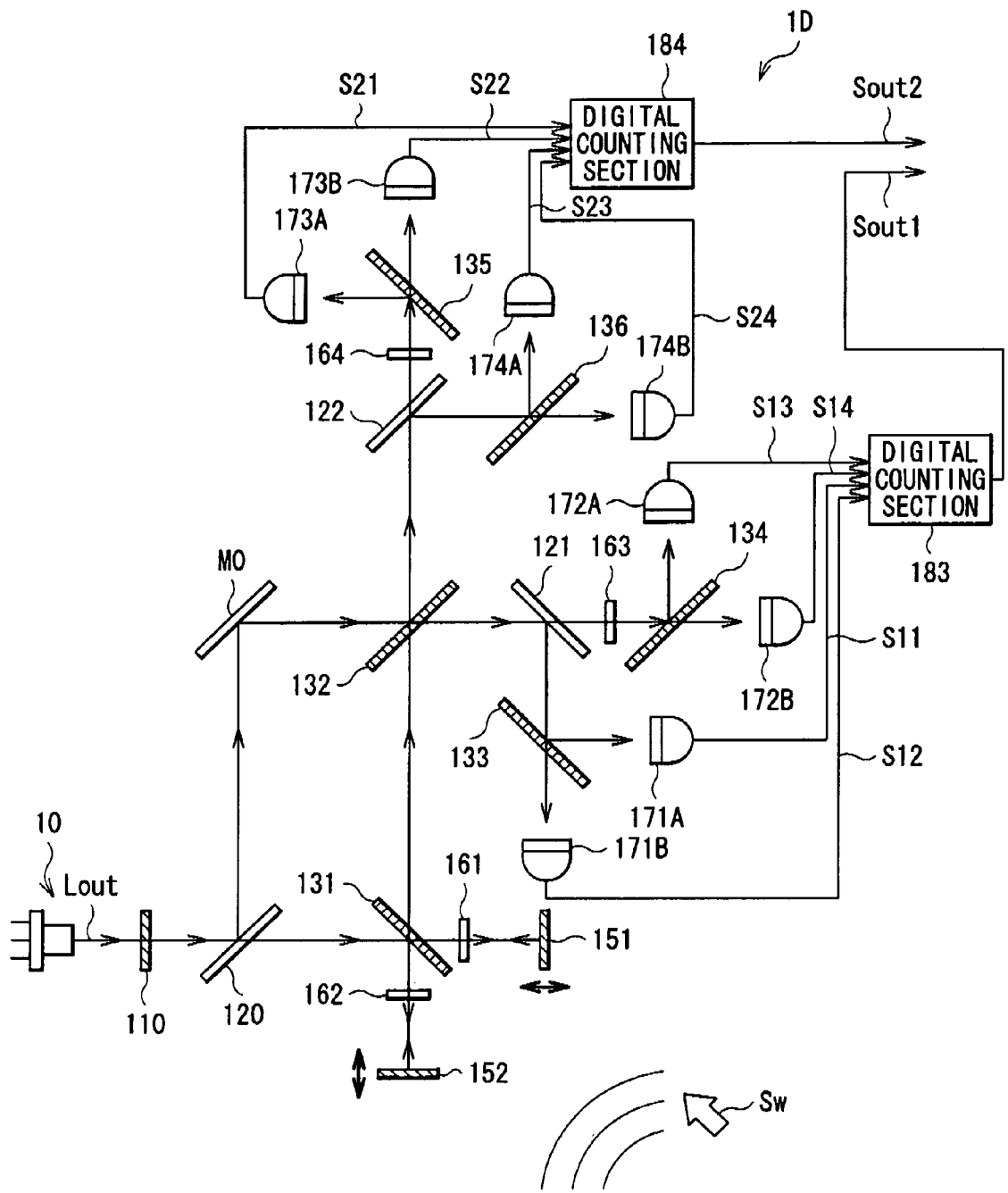
FIG. 8 is an illustration showing the whole configuration of a vibration detection device according to a second embodiment of the invention.

FIG. 8 shows the configuration of a vibration detection device (a microphone apparatus 1D) according to the embodiment. The microphone apparatus 1D includes polarizing beam splitters 133 to 136 instead of the polarizing plates 111 to 114 in the microphone apparatus 1 according to the first embodiment shown in FIG. 1, and includes four pairs of photoelectric conversion devices (photoelectric conversion devices 171A, 171B, 172A, 172B, 173A, 173B, 174A and 174B) instead of the photoelectric conversion devices 171 to 174, and digital counting sections 183 and 184 instead of the digital counting sections 181 and 182.

The polarizing beam splitter 133 splits the reached S-polarized component s1 and the reached P-polarized component p02 to provide them to the photoelectric conversion devices 171A and 171B. Moreover, the polarizing beam splitter 134 splits the reached S-polarized component s1 and the reached P-polarized component p02 to provide them to the photoelectric conversion devices 172A and 172B. The polarizing beam splitter 135 splits the reached P-polarized component p1 and the reached S-polarized component s02 to provide them to the photoelectric conversion devices 173A and 173B. Further, the polarizing beam splitter 136 splits the reached P-polarized component p1 and the reached S-polarized component s02 to provide them to the photoelectric conversion devices 174A and 174B. In such a configuration, in the photoelectric conversion devices 171A, 171B, 172A and 172B, the first interference patterns are detected in a state in which the phases thereof are different by 90° from each other, and four output signals S11 to S14 with phases different by 90° from one another can be obtained. Moreover, in the photoelectric conversion devices 173A, 173B, 174A and 174B, the second interference patterns are detected in a state in which the phases thereof are different by 90° from each other, and four output signals S21 to S24 with phases different by 90° from one another can be obtained. In this case, the signal values I(S11) to I(S14) and I(S21) to I(S24) of the output signals S11 to S14 and S21 to S24 are represented by, for example, the following formulas (5) to (12). In addition, A and B, and C and D represent the amplitudes of interfering beams, and λ represents the wavelength of the laser beam Lout, ΔL represents an optical path difference between the reference optical path and the first or second reflection optical path.

$$I(S11)=(A^2+B^2)+2AB\times\sin(2\pi\Delta L/\lambda) \quad (5)$$

$$I(S12)=(A^2+B^2)-2AB\times\sin(2\pi\Delta L/\lambda) \quad (6)$$

$$I(S13)=(A^2+B^2)+2AB\times\cos(2\pi\Delta L/\lambda) \quad (7)$$

$$I(S14)=(A^2+B^2)-2AB\times\cos(2\pi\Delta L/\lambda) \quad (8)$$

$$I(S21)=(C^2+D^2)+2CD\times\sin(2\pi\Delta L/\lambda) \quad (9)$$

$$I(S22)=(C^2+D^2)-2CD\times\sin(2\pi\Delta L/\lambda) \quad (10)$$

$$I(S23)=(C^2+D^2)+2CD\times\cos(2\pi\Delta L/\lambda) \quad (11)$$

$$I(S24)=(C^2+D^2)-2CD\times\cos(2\pi\Delta L/\lambda) \quad (12)$$

In addition to the functions in the digital counting sections 181 and 182 described in the first embodiment, the digital counting section 183 produces two first differential signals S1A and S1B (I(S1A)=I(S11)−I(S12) and I(S1B)=I(S13)−I(S14)) by obtaining a difference between output signals (between the output signals S11 and 12 and between the output signals S13 and S14) with phases different by 180° from each other among four output signals S11 to S14 obtained by the photoelectric conversion devices 171A, 171B, 172A and 172B. Moreover, the digital counting section 184 produces two second differential signals S2A and S2B (I(S2A)=I(S21)−I(S22) and I(S2B)=I(S23)−I(S24)) by obtaining a difference between output signals (between the output signals S21 and S22 and between the output signals S23 and S24) with phases different by 180° from each other among four output signals S21 to S24 obtained by the photoelectric conversion devices 173A, 173B, 174A and 174B. Moreover, the digital counting section 183 produces a first lissajous figure assuming that two first differential signals S1A and S1B are considered as signal points, and the digital counting section 184 produces a second lissajous figure assuming that two second differential signals S2A and S2B are considered as signal points.

Figure 9:
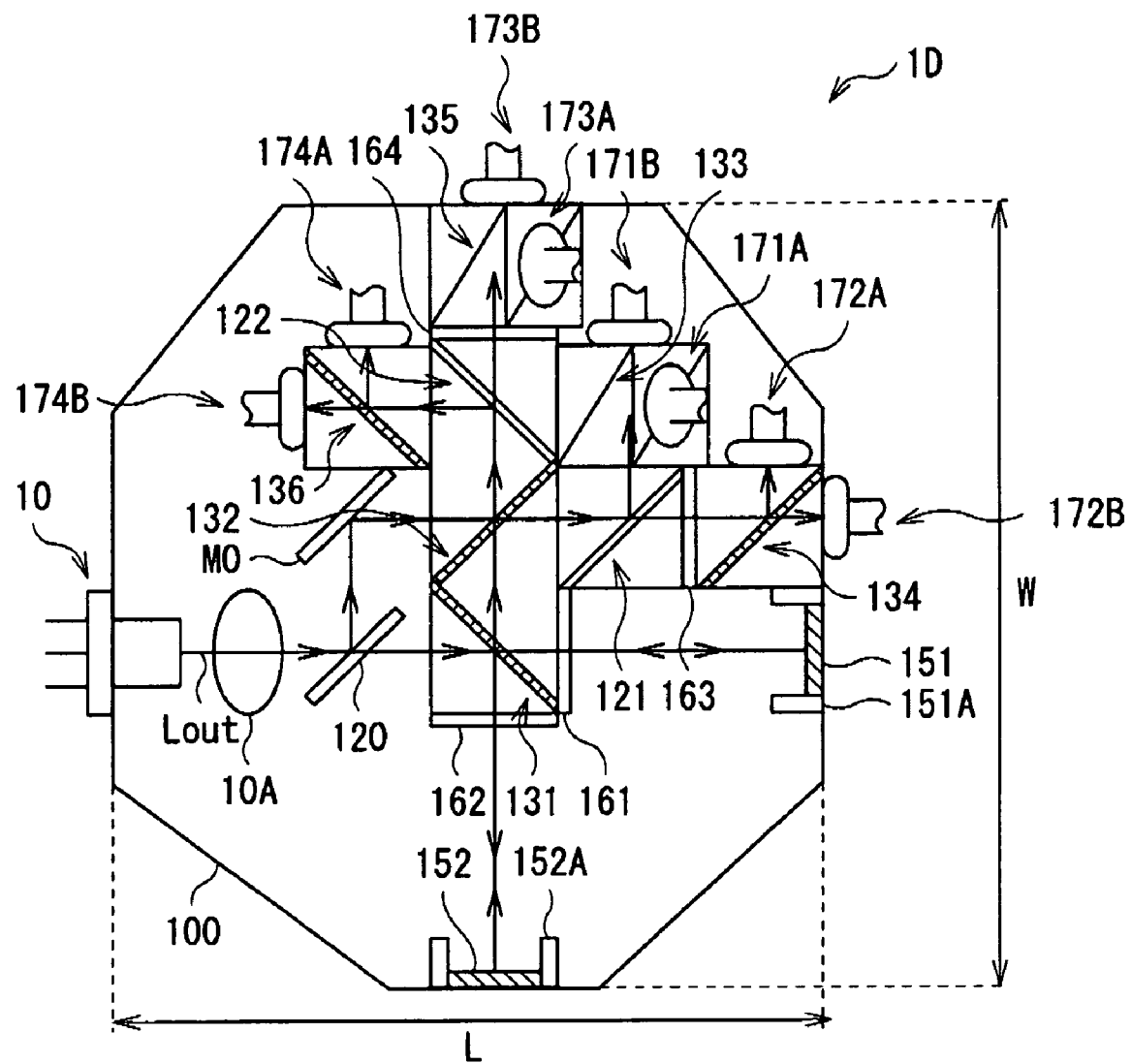
FIG. 9 is a plan view showing a configuration example in the case where the vibration detection device shown in FIG. 8 is arranged on a single substrate.

In the case where the microphone apparatus 1D according to the embodiment is formed on the substrate 100, as in the case of the first embodiment, for example, the microphone apparatus 1D can be configured as shown in FIG. 9.

The photoelectric conversion devices 171A, 171B, 172A and 172B correspond to a specific example of "four first photoelectric conversion devices" in the invention, and the photoelectric conversion devices 173A, 173B, 174A and 174B correspond to a specific example of "four second photoelectric conversion devices" in the invention. Moreover, the photoelectric conversion devices 171A, 171B, 172A, 172B, 173A, 173B, 174A and 174B and the digital counting sections 183 and 184 correspond to specific examples of "a detection means" in the invention, and the digital counting sections 183 and 184 correspond to specific examples of "a computation means", "a figure producing means" and "a counter" in the invention.

By such a configuration, in the microphone apparatus 1D according to the embodiment, two differential signals S1A and S1B or two differential signals S2A and S2B are produced from a difference between output signals with phases different by 180° from each other among four output signals S11 to S14 or four output signals S21 to S24 from four photoelectric conversion devices 171A, 171B, 172A and 172B, or the photoelectric conversion devices 173A, 173B, 174A and 174B with phases different by 90° from one another, and on the basis of the two differential signals S1A and S1B or the two differential signals S2A and S2B, a lissajous figure is produced, so even in the case where a DC (direct current) offset component (for example, portions of ($A^2+B^2$) and ($C^2+D^2$) in the above-described formulas (5) to (12)) due to strength fluctuations of the laser beam Lout is produced in the output signal from the photoelectric conversion device, the DC offset component can be cancelled and removed. Therefore, in addition to the effects in the first embodiment, the vibrations of the vibration films 151 and 152 can be detected more stably, and the detection accuracy can be further improved.

Figure 10:
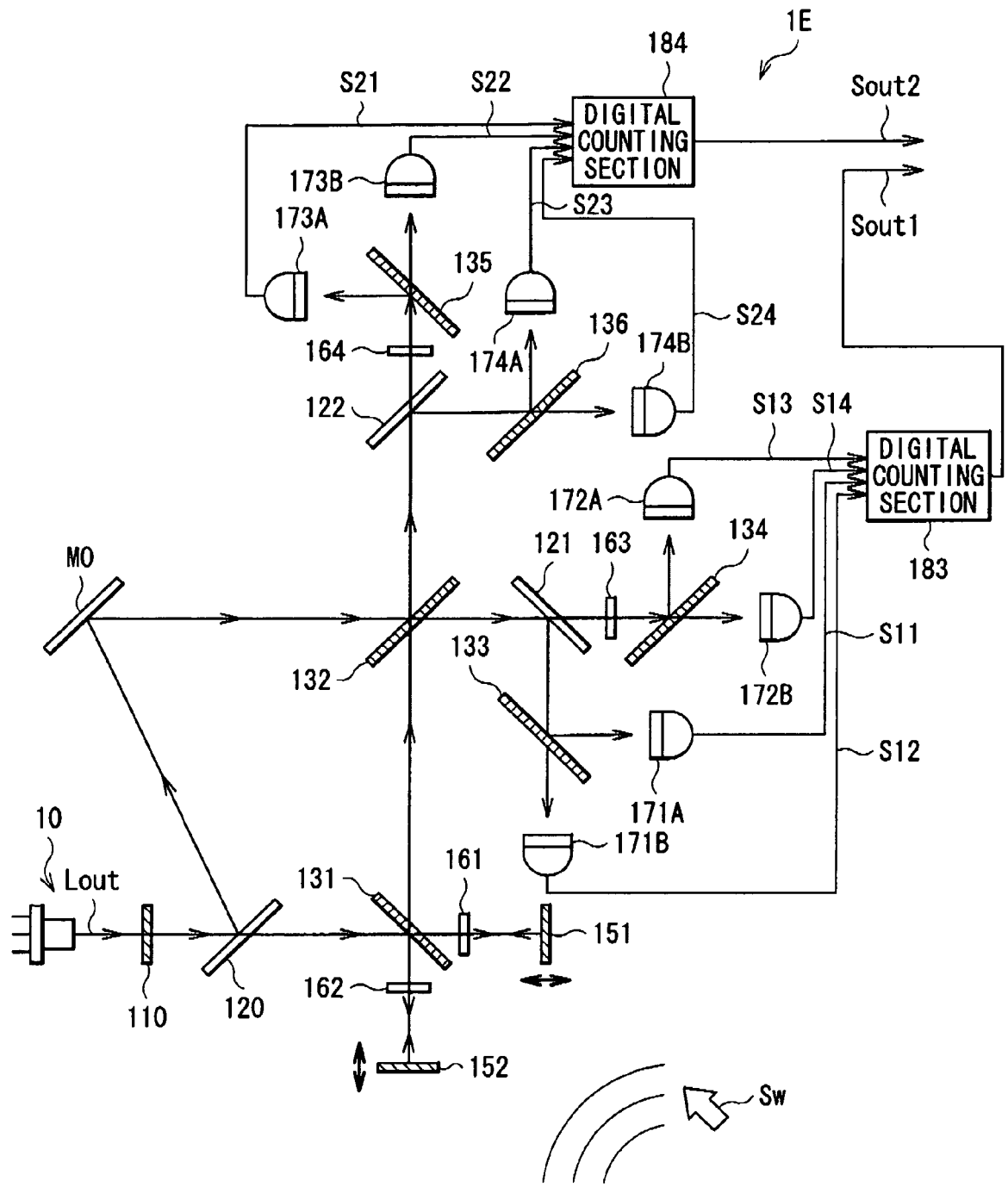
FIG. 10 is an illustration showing the whole configuration of a vibration detection device according to a modification of the second embodiment.
Figure 11:
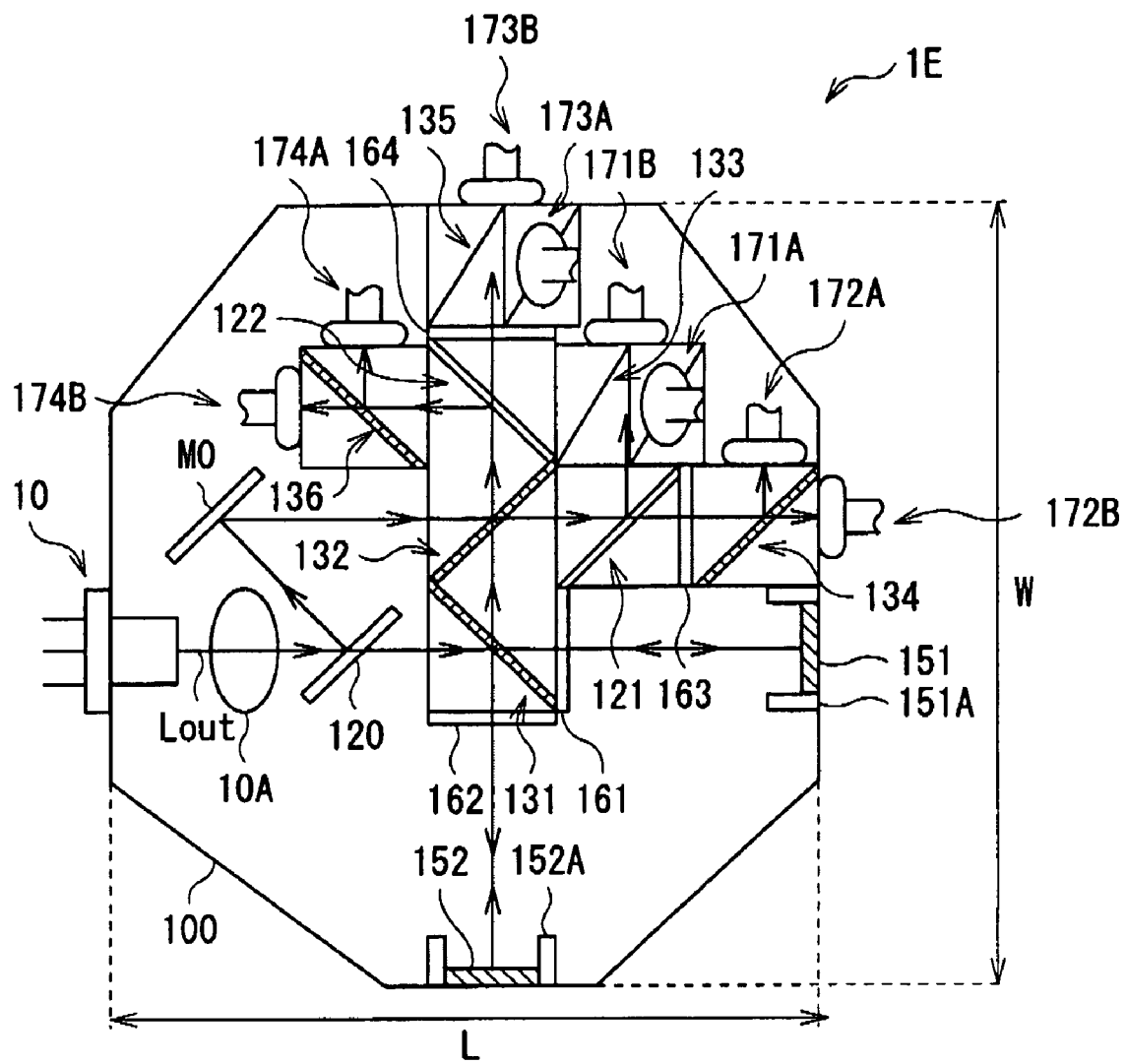
FIG. 11 is a plan view showing a configuration example in the case where the vibration detection device shown in FIG. 10 is arranged on a single substrate.

In the embodiment, for example, like a microphone apparatus 1E shown in FIGS. 10 and 11, for example, the positions, angles or the like of the beam splitter 120 and the reflective mirror M0 are preferably adjusted so that the optical path length of the third optical path becomes substantially the same as the optical path length of each of the first and second optical paths.

Moreover, in the embodiment, as in the case of the first embodiment, reflective mirrors M1 and M2 (reflection bodies) capable of reflecting a laser beam traveling along the first optical path or the second optical path may be arranged between the vibration films 151 and 152 and λ/4 plates 161 and 162 (or the polarization beam splitter 131).

Although the invention is described referring to the first and second embodiments, the invention is not limited to them, and can be variously modified.

Figure 12:
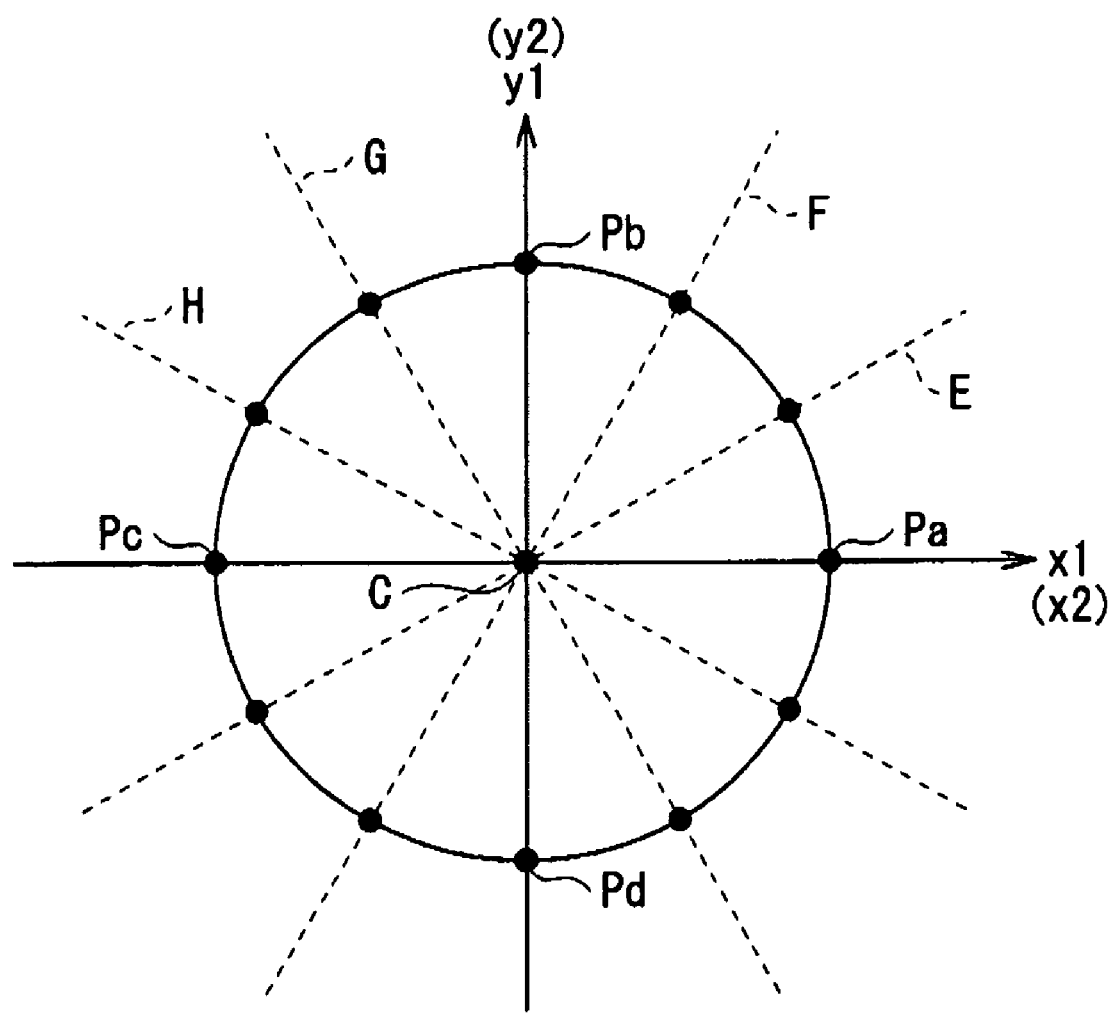
FIG. 12 is an illustration showing an example of a lissajous figure according to a modification of the invention.

For example, in the above-described embodiments, the case where four reference points Pa to Pd are arranged on the lissajous figure to perform digital counting is described; however, the number of reference points is not limited to four, and, for example, as shown in FIG. 12, for example, reference lines E to H may be used in addition to four reference points Pa to Pd to arrange more reference points with a smaller spacing. In such a configuration, the counting number can be increased, so the values of the output signals Sout1 and Sout2 can be increased, and the detection sensitivity can be further improved.

Moreover, in the above-described embodiments, the case where a semiconductor laser is used as the light source emitting the laser beam Lout is described; however, except for the semiconductor laser, for example, a gas laser, a solid-state laser or the like may be used.

Further, in the above-described embodiments, as an example of the vibration detection device according to the embodiments of the invention, the optical microphone apparatus in which the vibrating bodies are the vibration films (the vibration films 151 and 152) vibrating in response to a sonic wave, and the vibrations of the vibration films 151 and 152 are detected as audio signals Sout1 and Sout2 is described; however, the vibration detection device according to the embodiments of the invention is not limited to this, and may be configured to detect other vibrations.

Figure 13:
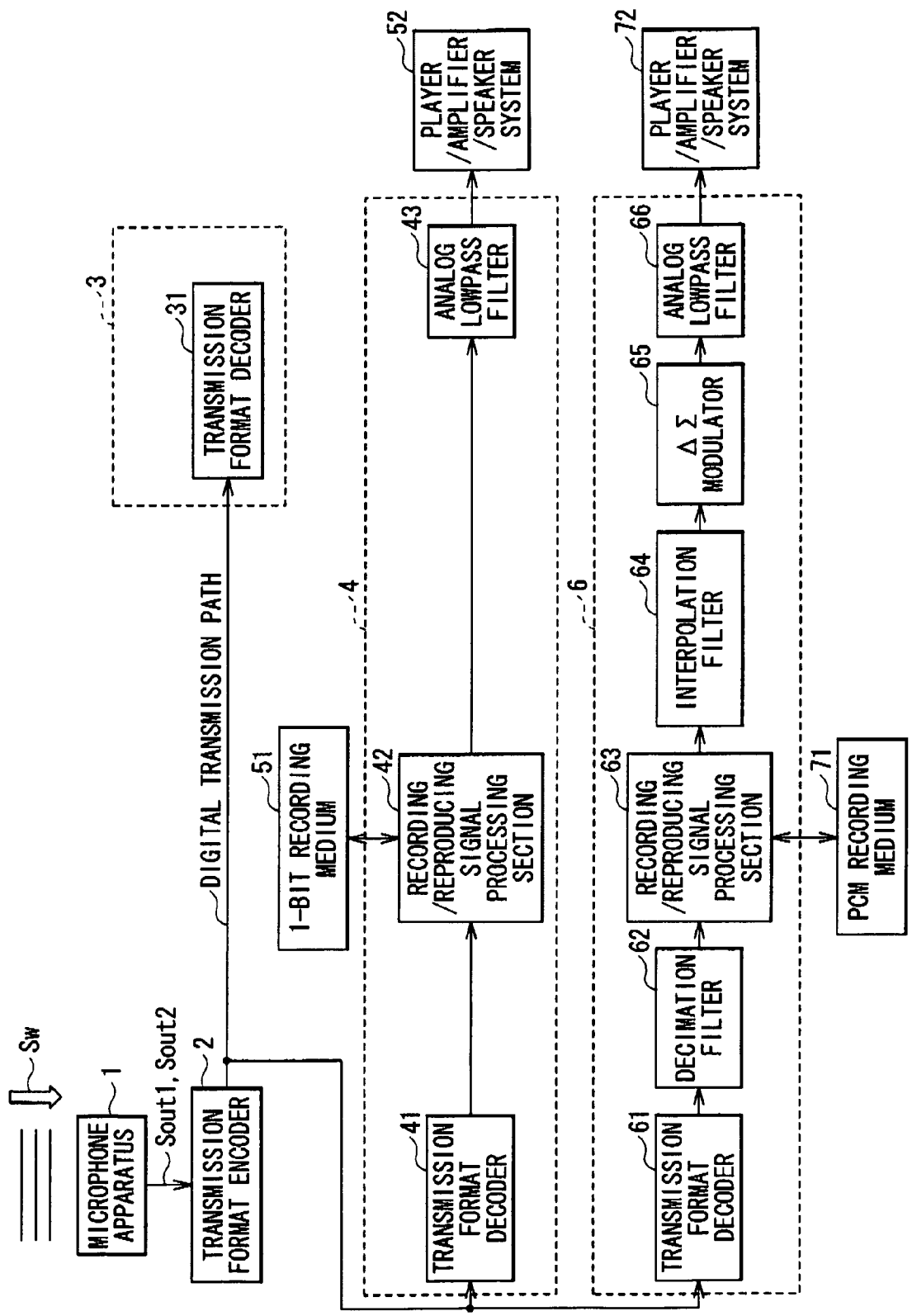
FIG. 13 is a block diagram showing a configuration example of an audio recording/reproduction system including a vibration detection device of the invention.

For example, as shown in FIG. 13, the vibration detection device (the microphone apparatus) according to the embodiments of the invention can be applied to an audio signal recording/reproducing system including, in addition to the microphone apparatus 1 shown in FIG. 1 (or the microphone apparatus 1A shown in FIG. 4, the microphone apparatus 1B shown in FIG. 6, the microphone apparatus 1C shown in FIG. 7, the microphone apparatus 1D shown in FIG. 8, the microphone apparatus 1E shown in FIG. 10 or the like), a transmission format encoder 2 which encodes the audio signals Sout1 and Sout2 outputted from the microphone apparatus 1, an editing device 3 connected with the transmission format encoder 2 by a digital transmission path (for example, an optical fiber or the like), a 1-bit stream recorder 4, a PCM (Pulse Code Modulation) recorder 6, a 1-bit recording medium 51, a PCM recording medium 71, and player/amplifier/speaker systems 52 and 72. The editing device 3 includes a transmission format decoder 31. The 1-bit stream recorder 4 includes a transmission format decoder 41 connected to the transmission format encoder 2 via a digital transmission path, a recording/reproducing signal processing section 42 connected to the transmission format decoder 41 and the 1-bit recording medium 51, and an analog lowpass filter 43 connected between the recording/reproducing signal processing section 42 and the player/amplifier/speaker system 52. The PCM recorder 6 includes a transmission format decoder 61 connected to the transmission format encoder 2 via a digital transmission path, a decimation filter 62 connected to the transmission format decoder 61, a recording/reproducing signal processing section 63 connected to the decimation filter 62 and the PCM recording medium 71, an interpolation filter 64 connected to the recording/reproducing signal processing section 63, a ΔΣ modulator 65 connected to the interpolation filter 64, and an analog lowpass filter 66 connected between the ΔΣ modulator 65 and the player/amplifier/speaker system 72. In the audio signal recording/reproducing system with such a configuration, binarized audio signals Sout1 and Sout2 can be transmitted, so compared to the case where an analog audio signal is transmitted, long-distance transmission can be easily performed.

It should be understood by those skilled in the art that various modifications, combinations, subcombinations and alterations may occur depending on design requirements and other factors insofar as they are within the scope of the appended claims or the equivalents thereof.

What is claimed is:

1. A vibration detection device comprising:
   a light source emitting a laser beam;
   an interferometer including a first vibrating body and a second vibrating body both capable of reflecting the laser beam and being displaced by a sonic wave, the interferometer splitting the laser beam into beams traveling along first to third optical paths, and the interferometer causing interference between a first reflected beam reflected by the first vibrating body in the first optical path and a reference beam passing through the third optical path to form a first interference pattern, and causing interference between a second reflected beam reflected by the second vibrating body in the second optical path and the reference beam to form a second interference pattern; and
   a detection means quantizing the vibrations of the first and second vibrating bodies on the basis of the formed first and second interference patterns to detect the vibrations.

2. The vibration detection device according to claim 1, wherein
   the interferometer includes:
   a beam splitter splitting a laser beam emitted from the light source into laser beams, one of the laser beams going forward to the first and second optical paths and another going forward to the third optical path, and
   a first polarizing beam splitter splitting the one laser beam split by the beam splitter into laser beams traveling along the first optical path and the second optical path.

3. The vibration detection device according to claim 2, wherein
   the interferometer includes a reflection body each between the first vibrating body and the first polarization beam splitter and between the second vibrating body and the first polarization beam splitter, the reflection body capable of reflecting a laser beam traveling along the first optical path or the second optical path.

4. The vibration detection device according to claim 1, wherein
the interferometer includes a second polarizing beam splitter splitting the reference beam into a first polarized component and a second polarized component,
the first interference pattern is formed by interference between the first reflected beam and the first polarized component of the reference beam, and
the second interference pattern is formed by interference between the second reflected beam and the second polarized component of the reference beam.

5. The vibration detection device according to claim 4, wherein
a polarization direction of the first reflected beam is orthogonal to that of the first polarized component of the reference beam, and a polarization direction of the second reflected beam is orthogonal to that of the second polarized component of the reference beam, and
the interferometer includes first polarizing plates and second polarizing plates between the second polarizing beam splitter and the detection means,
the first polarizing plates having a polarizing axis in a direction inclined 45° from each of the polarization direction of the first reflected beam and the polarization direction of the first polarized component of the reference beam, and
the second polarizing plates having a polarizing axis in a direction inclined 45° from each of the polarization direction of the second reflected beam and the polarization direction of the second polarized component of the reference beam.

6. The vibration detection device according to claim 1, wherein
the optical path length of the third optical path is designed to be substantially the same as the optical path length of each of the first and second optical paths.

7. A vibration detection device comprising:
a light source emitting a laser beam:
an interferometer including a first vibrating body and a second vibrating body both capable of reflecting the laser beam, the interferometer splitting the laser beam into beams traveling along first to third optical paths, and the interferometer causing interference between a first reflected beam reflected by the first vibrating body in the first optical path and a reference beam passing through the third optical path to form a first interference pattern, and causing interference between a second reflected beam reflected by the second vibrating body in the second optical path and the reference beam to form a second interference pattern; and
a detector that quantizes the vibrations of the first and second vibrating bodies on the basis of the formed first and second interference patterns to detect the vibrations;
a first set of photoelectric conversion devices detecting the first interference pattern,
wherein a photoelectric conversion device of the first set of the photoelectric conversion devices detects the first interference pattern with a 90° phase difference from a phase of the first interference pattern detected by another photoelectric conversion device of the first set of photoelectric conversion devices;
a second set of photoelectric conversion devices detecting the second interference pattern,
wherein a photoelectric conversion device of the second set of the photoelectric conversion devices detects the second interference pattern with a phase different by 90° phase difference from a phase of the second interference pattern detected by another photoelectric conversion device of the second set of photoelectric conversion devices;
a figure producer that produces a Lissajous figure with a circular or arc shape on a first plane based on a pair of output signals from the first set of photoelectric conversion devices, and producing a second Lissajous figure with a circular or arc shape on a second plane based on a pair of output signals from the second set of photoelectric conversion devices, and
a counter counting the number of times where a signal point defined by the pair of the output signals passes through a predetermined reference point on each of the produced first and second Lissajous figures.

8. A vibration detection device comprising:
a light source emitting a laser beam;
an interferometer including a first vibrating body and a second vibrating body both capable of reflecting the laser beam, the interferometer splitting the laser beam into beams traveling along first to third optical paths, and the interferometer causing interference between a first reflected beam reflected by the first vibrating body in the first optical path and a reference beam passing through the third optical path to form a first interference pattern, and causing interference between a second reflected beam reflected by the second vibrating body in the second optical path and the reference beam to form a second interference pattern; and
a detector that quantizes the vibrations of the first and second vibrating bodies on the basis of the formed first and second interference patterns to detect the vibrations,
a first set of photoelectric conversion devices detecting the first interference pattern,
wherein each photoelectric conversion device of the first set of the photoelectric conversion devices detects the first interference pattern with a 90° phase difference from a phase of the first interference pattern detected by the other photoelectric conversion devices of the first set of photoelectric conversion devises;
a second set of photoelectric conversion devices detecting the second interference patterns,
wherein each photoelectric conversion device of the second set of the photoelectric conversion devices detects the second interference pattern with a 90° phase difference from a phase of the second interference pattern detected by the other photoelectric conversion devices of the second set of photoelectric conversion devises;
a computation producer that produces a pair of first differential signals by obtaining a difference between output signals, from the first set of photoelectric conversion devices, with phases different by 180° from each other, and producing a pair of second differential signals by obtaining a difference between the output signals, from the second set of photoelectric conversion devices, with phases different by 180° from each other;
a figure producer that produces a first Lissajous figure with a circular or arc shape on a first plane based on each of the pair of first differential signals, and producing a second Lissajous figure with a circular or arc shape on a second plane based on each of the pair of second differential signals; and
a counter counting the number of times where a signal point defined by each of the first and second differential signals passes through a predetermined reference point on each of the produced first and second Lissajous figures.

9. The vibration detection device according to claim 1, wherein the light source, the interferometer and the detection means are formed on a single substrate.

10. A vibration detection device comprising:
a light source emitting a laser beam;
an interferometer including a first vibrating body and a second vibrating body both capable of reflecting the laser beam, the interferometer splitting the laser beam into beams traveling along first to third optical paths, and the interferometer causing interference between a first reflected beam reflected by the first vibrating body in the first optical path and a reference beam passing through the third optical path to form a first interference pattern, and causing interference between a second reflected beam reflected by the second vibrating body in the second optical path and the reference beam to form a second interference pattern; and
a detector that quantizes the vibrations of the first and second vibrating bodies on the basis of the formed first and second interference patterns to detect the vibrations,
wherein the first and second vibrating bodies are vibration films vibrating in response to a sonic wave, and the vibration detection device is configured as an optical microphone apparatus separately detecting each of the vibrations of the vibration films as a quantized audio signal.

11. A vibration detection device comprising:
a light source emitting a laser beam;
an interferometer including a first vibrating body and a second vibrating body both capable of reflecting the laser beam and being displaced by a sonic wave, the interferometer splitting the laser beam into beams traveling along first to third optical paths, and the interferometer causing interference between a first reflected beam reflected by the first vibrating body in the first optical path and a reference beam passing through the third optical path to form a first interference pattern, and causing interference between a second reflected beam reflected by the second vibrating body in the second optical path and the reference beam to form a second interference pattern; and
a detection section quantizing the vibrations of the first and second vibrating bodies on the basis of the formed first and second interference patterns to detect the vibrations.

* * * * *